(12) United States Patent
Heinzen

(10) Patent No.: US 6,615,639 B1
(45) Date of Patent: *Sep. 9, 2003

(54) SELF MONITORING STATIC SEAL

(76) Inventor: Ralph Heinzen, Box 728, Garrison, ND (US) 58540

( * ) Notice: Subject to any disclaimer, the term of this patent is extended or adjusted under 35 U.S.C. 154(b) by 0 days.

This patent is subject to a terminal disclaimer.

(21) Appl. No.: 09/090,056

(22) Filed: Jun. 3, 1998

Related U.S. Application Data

(63) Continuation-in-part of application No. 08/686,315, filed on Jul. 25, 1996, now Pat. No. 5,785,323, which is a continuation-in-part of application No. 08/114,507, filed on Aug. 31, 1993, now Pat. No. 5,540,448, which is a continuation-in-part of application No. 07/841,388, filed on Feb. 25, 1992, now Pat. No. 5,246,235.

(51) Int. Cl.⁷ .............................. G01N 3/56; F16J 15/16
(52) U.S. Cl. ................ 73/7; 116/208; 277/321; 277/919
(58) Field of Search ................... 73/7; 277/321, 277/919; 116/208

(56) References Cited

U.S. PATENT DOCUMENTS

| | | | |
|---|---|---|---|
| 3,556,258 A | 1/1971 | Winge et al. | 116/208 X |
| 3,716,113 A | 2/1973 | Kobayashi et al. | 116/208 X |
| 4,184,145 A | 1/1980 | Fima | 116/208 X |
| 4,832,160 A | 5/1989 | Fargier et al. | 116/208 X |
| 5,111,178 A | 5/1992 | Bosze | 338/160 |
| 5,419,415 A | 5/1995 | Lamb et al. | 116/208 X |
| 5,608,376 A | 3/1997 | Ito et al. | 116/208 X |
| 5,934,415 A | 8/1999 | Preston et al. | 116/208 X |

FOREIGN PATENT DOCUMENTS

| | | | |
|---|---|---|---|
| DE | 3444175 C1 | 3/1986 | |
| FR | 2574508 | 6/1986 | |
| JP | 61-79103 | 4/1986 | 73/7 |
| SU | 976172 | 11/1982 | |
| SU | 1307115 A1 | 4/1987 | |

*Primary Examiner*—Thomas P. Noland
(74) *Attorney, Agent, or Firm*—Kinney & Lange, P.A.

(57) ABSTRACT

A seal for preventing leakage of fluid from between a first member and a second member the second member is capable of moving toward and away from the first member, the seal is adapted for engaged contact with the first member and the second member so as to prevent leakage of fluid between the first member and the seal and between the second member and the seal, the seal being more easily deteriorated than the second member such that friction between the seal and the second member wears the seal faster than the second member, the seal being adapted to retain a fluid tight seal against the second member as long as the seal has not worn beyond a specified depth; and a conductor for placement about the second member, the conductor being attached to the seal at the specified depth so as to contact the second member when the seal has worn to the specified depth, such that the existence of electrical discontinuity between the conductor and the second member indicates that the seal requires replacement, the conductor is positionally associated to the seal such that wear of the seal corresponds with movement of the conductor toward the second member; and the electrical continuity indicates whether the seal requires replacement.

16 Claims, 8 Drawing Sheets

SELF MONITORING STATIC SEAL

CROSS-REFERENCE TO RELATED APPLICATIONS

This application is a continuation-in-part of my application Ser. No. 08/686,315, filed Jul. 25, 1996, and now U.S. Pat. No. 5,785,323, which is a continuation-in-part of my Ser. No. 08/114,507, filed Aug. 31, 1993, now U.S. Pat. No. 5,540,448, issued Jul. 30, 1996, entitled SEAL WITH ELECTRICAL CONDUCTOR WEAR INDICATOR, which in turn is a continuation-in-part of my Ser. No. 07/841,388, filed Feb. 25, 1992, now U.S. Pat. No. 5,246,235, issued Sep. 21, 1993, entitled SEAL WITH EMBEDDED WIRE.

BACKGROUND OF THE INVENTION

The present invention relates to seals which are positioned against a moving surface, and more particularly to seals which prevent fluid, e.g. lubricant, leakage or passage between two surfaces. The seal includes a conductor, such as an optical or electrical conductor, for indicating that the body of the seal has undergone excessive wear or deterioration. The conductor is embedded within or attached to the body of the seal at a specified depth or location, namely the depth or extent of acceptable wear. The conductor may be an optical conductor, such as an optical fiber, or an electrical conductor, such as a wire or other means of conducting electricity. The continuity of the conductor can be checked to determine if the seal body has worn to the specified depth or been deteriorated beyond a specified extent.

Machinery often includes members which move with respect to each other. Bearings have long been used to facilitate such movement. Bearings are used to aid in transmitting forces from one member to another and to reduce friction. Rolling elements are often used in bearings to reduce friction, such as in ball bearings. Bearings often contain lubricant to reduce the friction created within the bearing.

Leakage of fluid from between mechanical parts has long been a problem. Contamination of the bearings or seals with foreign material such as dirt has also long been a problem. Both loss of fluid and contamination lead to increased friction and wear within the structure, damaging the structure and perhaps damaging the machinery.

Seals composed of a soft polymeric material are used with bearings to prevent lubricant leakage and contamination. The polymeric material contacts a moving surface in the bearing and provides a seal. Friction between the polymeric material and the moving surface gradually wears the surface of the polymeric material away. If the polymeric material becomes too worn, it will no longer form a tight seal against the moving surface, and fluid leakage from the bearing and contamination of the bearing again become problems.

In other instances metal or polymeric seals are placed between the moving parts. This arrangement is particularly useful when the movement is a reciprocal movement. Non-limiting illustrations of a reciprocating seal include a piston and cylinder structure, hatches, air locks, doors, covers, lids and caps. With regard to such seals as found in hatches, air locks, doors, covers, lids and caps, the interfitting members may be said to reciprocate with respect to each other, in the sense of opening and closing with regard to each other. However, when a seal is in fluid tight sealing relationship between such interfitting members, the seal may more properly be termed a static or stationary seal, since the interfitting members and the interposed seal are all stationary with regard to each other while the integrity of the sealing relationship is maintained. In certain types of members which are reciprocating with respect to each other, the seal may be made so that it always makes contact with the piston connecting rod and the connecting rod is electrically insulated from the piston barrel. Sealing integrity or effectiveness may also be compromised by cracking, breaking, loss of flexibility or deterioration due to such conditions as repeated flexing, bending and/or compression, or length of contact with various fluids or container contents.

Various methods have been developed to prevent or detect leakage past a seal. As shown in U.S. Pat. No. 4,761,023, one method involves monitoring the pressure of the fluid on the high pressure side of the seal, with a loss of pressure indicating leakage past the seal. Alternatively, as shown in U.S. Pat. No. 4,290,611, the fluid pressure on the low pressure side of the seal may be monitored, with an increase in pressure indicating fluid leakage. A third method, such as that shown in U.S. Pat. No. 4,178,133, uses colored fluid and visual monitoring of leakage past a seal. Still other methods involve manual maintenance procedures, wherein seals are inspected or replaced on a regular basis.

These various methods to prevent or detect leakage past a seal have not proven satisfactory due to a number of problems. A problem with monitoring fluid pressure is that it is only effective to detect leakage of the fluid. Often this is too late to prevent damage. It is desired that the seal be replaced before leakage has begun. Similarly, visual monitoring of fluid leakage can only indicate that leakage has begun, not that leakage is about to begin. A problem with manual inspection of a seal is that it requires an inspector who is not only trained but also diligent. Often seals are not inspected merely due to neglect or lack of diligence. Another problem with manual inspection is that it may require the machinery to be stopped during the inspection, which can be inconvenient. Scheduled seal replacement also has problems. Seals may wear more or less quickly depending on operating conditions, and scheduled seal replacement may occur too early (before the seal needs to be replaced) or too late (after the seal starts leaking).

An excellent solution to these problems has been provided by the inventions disclosed in my U.S. Pat. No. 5,540,448, issued Jul. 30, 1996, entitled SEAL WITH ELECTRICAL CONDUCTOR WEAR INDICATOR and in my U.S. Pat. No. 5,246,235, issued Sep. 21, 1993, entitled SEAL WITH EMBEDDED WIRE. The present invention is an improvement on my earlier disclosed seals and is particularly adapted to work with reciprocating surfaces which require a seal there between. Illustrative of such reciprocating surfaces are the piston and cylinder, hatches, air locks, doors, covers, lids, caps, etc.

SUMMARY OF THE INVENTION

The present invention provides a seal for recognizing excessive seal wear before fluid leakage occurs. The seal is placed between surfaces which may be moving or static with respect to each other and forms a seal with the moving surface or between the static surfaces to prevent fluid leakage. The seal includes a seal body and an optical or electrical conductor. The seal body is composed of a substance which allows it to make a seal with the adjacent surface. various conditions between the surface and the seal body cause gradual deterioration and/or wear of the seal body. For example, friction between a moving surface and the seal body may cause gradual wear of the seal body. Extended contact with a fluid or container contents may cause gradual deterioration or disintegration of the seal body. Aging of the seal material or repeated compression of the seal, as in continued forming and releasing of the seal, may cause gradual loss of resiliency, leading to cracking, breaking or splitting of the seal body.

The optical or electrical conductor may be embedded in the seal body, attached to the seal body or otherwise positioned so that deterioration of the seal body will gradually change the location of the conductor with respect to the adjacent surface or with respect to the surface of the seal body. Deterioration of the seal body to a specified depth can be detected by optical or electrical continuity of the conductor. An electrical conductor may contact the adjacent surface when deterioration of the seal body reaches a specified depth, with electrical continuity between the conductor and the adjacent surface indicating that the seal requires replacement. With an optical conductor attached to the seal, optical fibers will gradually be worn away as the seal wears. An optical sensor may be able to measure such parameters as wear, temperature or strain on the seal. Alternatively, the conductor may be positioned such that it is worn entirely through when the wear of the seal body reaches a specified depth, with loss of optical or electrical continuity through the conductor indicating that the seal requires replacement.

The present invention provides a simple, cost effective device and method to detect deterioration of a seal disposed between moving or reciprocating surfaces, avoiding the problems of previous devices. Because the device detects deterioration of the seal body rather than fluid leakage, the seal may be replaced prior to leakage. The problems associated with waiting until after leakage has begun before replacing the seal may be avoided. The seal may be replaced in a timely manner before leakage begins. Because the present invention is based on optical or electrical continuity, an optical or electrical signal circuit may easily be incorporated with the invention. The signal circuit may indicate to an operator when a seal needs to be replaced, and there is no problem with diligence on the part of an inspector. Because wear of the seal body may be determined without manual inspection, problems with training inspectors and with missed or failed inspections are avoided. There is also no need to stop the equipment or machinery just to check if the seal needs to be replaced. Because the present invention monitors the actual amount of deterioration on the seal body, there is no problem with early or late replacement of the seal based on a scheduled replacement program. Replacement of the seal of the present invention may be based on the actual life of the seal body in operation, not on an average seal body life. Seals may be replaced less often and cost is reduced.

The present invention provides a seal for preventing passage of a fluid between two members. The seal is in engaging contact with both members to prevent passage of fluid between the two members and the seal. The seal is adapted to retain a fluid tight seal with the members so long as the seal has not deteriorated beyond a specified degree. A conductor is placed around one of the members. The conductor serves to conduct a signal. The conductor is positioned with respect to the seal such that deterioration of the seal beyond a specified degree corresponds with signal discontinuity of the conductor. The signal discontinuity through the conductor indicates a requirement for replacement of the seal. The seal may be an electrical signal or an optical signal.

DETAILED DESCRIPTION OF THE INVENTION

Figure 1:
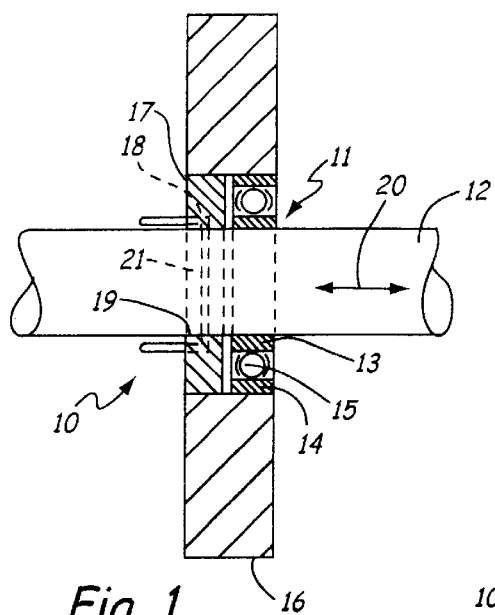
FIG. 1 shows a cross-sectional side view of the seal in place, adjacent a bearing and around a reciprocating shaft.

FIG. 1 shows the seal 10 of the present invention in place, against a bearing 11 and around a shaft 12. The shaft 12 may reciprocate as indicated by arrow 20. The bearing 11 may have an inside race 13, and outside race 14, and a plurality of rolling elements, e.g. balls 15. The inside race 13 may be movably engaged with the shaft 12. In other words the shaft may reciprocate in said bearing. The outside race 14 and the seal 10 may be connected to a housing 16. The bearing may be of spherical balls, as shown.

The seal 10 of the present invention includes a seal body 17 and an embedded conductor 18. As shown in FIG. 1, the seal body 17 may press against the shaft 12, forming a tight seal between the seal body 17 and the shaft 12. Alternatively, the seal body 17 may press against the inside race 13, forming a tight seal between the seal body 17 and the inside race 13. The seal body 17 functions to prevent fluid leakage from the bearing 11.

The seal body 17 may have a contact surface 19 defined as the surface which contacts the adjacent moving surface of the shaft 12 to form a tight seal. The seal body 17 may be composed of a polymeric material or other suitable substance and should be a dielectric or an electrical insulator. The material of the seal body 17 is softer than the shaft 12, so that friction preferentially wears the seal body 17 rather than the shaft 12. The contact surface 19 of the seal body 17 gradually wears away due to friction between the outer surface of the shaft 12 and the seal body 17.

Figure 2:
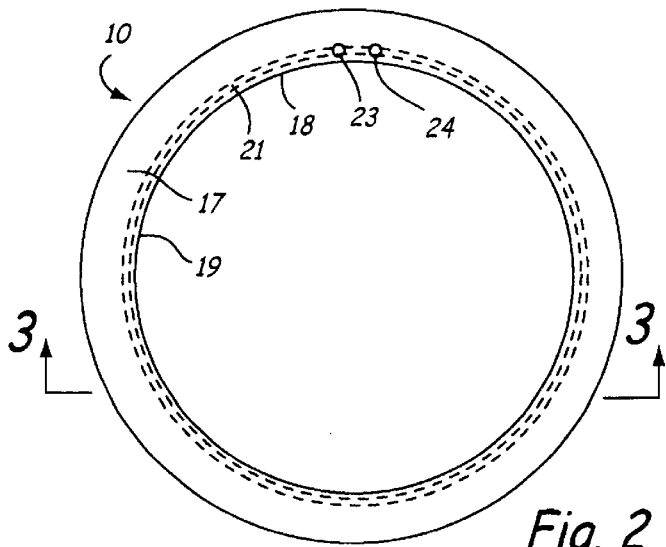
FIG. 2 is an enlarged fragmentary side view of the seal of FIG. 1.

A conductor 18 may be embedded within the seal body 17 at a specified depth, as shown with reference to FIG. 2. Alternatively, the conductor 18 may be attached to the outside of the seal body 17 at a specified depth. The seal body 17 may be initially formed such that the contact surface 19 has an interference fit with the outer surface of the shaft 12. The portion of the seal body 17 forming the interference fit may be referred to as the wear lip. The specified depth at which the conductor 18 is embedded within or attached to the seal body 17 may be slightly less than the depth of seal wear which will cause the seal 10 to leak. For instance, the specified depth may be at 90% of the initial depth of the wear lip. In this case, if leakage of the seal 10 occurs when the wear lip is completely worn away, electrical continuity through the conductor would indicate when the seal is 90% worn toward leakage. Of course, the desired specified depth of the conductor 18 is dependant upon the particular application, and this example is not intended to limit the scope of the invention.

The conductor 18 may be composed of any material which conducts electricity, such as a metal wire or a carbon filament. Preferably, the conductor 18 may be formed of an electrically conductive polymer such as a conductive epoxy known as a polymer thick film (PTF). The PTF may contain a polymer base material and a fill material to provide electrical conductivity. The fill material in the PTF may be any material which will allow the PTF to conduct electricity upon curing, such as particles of iron, aluminum, copper, silver, gold, or carbon. The PTF material may exist in a liquid or paste form prior to curing into a solid. Alternatively, the PTF material may exist in a solid solder form which converts to a liquid form upon heating. PTF materials are currently used in the surface mount of miniaturized electronic products, such as microelectronic printed circuit boards.

The liquid or paste state of the PTF provides ease of workability and application to the polymer material of the seal body 17, as well as reliable adherence to the seal body 17. The PTF may be applied to the seal body 17 by brushing or by drawing a bead of PTF out of a syringe onto the surface of the seal body 17. Alternatively, the PTF may be applied to the seal body 17 through screen printing, masking or stenciling.

The cured PTF may take on similar physical properties to the polymeric material of the seal body, including that the thick film application is softer than the shaft 12 so that friction preferentially wears the PTF application rather than the shaft 12. Accordingly, the PTF may itself form part or all of the contact surface 19 at various depths of seal wear.

An example of a PTF material is PTEA400 manufactured by Pinnacle Technologies, Inc. of Mattawans, Pa. The PTEA400 material is an epoxy adhesive base filled with gold particles. Upon curing, the PTEA400 material has a volume resistivity of 0.002 ohm-cm. The consistency of the PTEA400 material before curing is a smooth thixotropic paste. Curing of the PTEA400 takes place in approximately two hours at 150° C. or other similar conditions.

While the conductor 18 may be attached to the outside of the seal body 17 and openly exposed, it is preferable to insulate the conductor 18 by the seal body 17 or by an insulation layer of a dielectric or electrically nonconductive material. The insulation layer helps to prevent accidental or premature shorting of the conductor 18 with the shaft 12 or other exposed surfaces. The insulation layer may be provided by a material which is applied in a liquid or paste form, which dries or cures into a solid material. Using an insulating material which is applied in a liquid form has advantages similar to those discussed above for PTF. The insulation layer may have similar physical properties to the polymeric material of the seal body, and the insulation layer may itself form part or all of the contact surface 19 at various depths of seal wear. An example of a material suitable for use as the insulation layer is LIQUID ELECTRICAL TAPE manufactured by Starbright of Fort Lauderdale, Fla.

Figure 3:
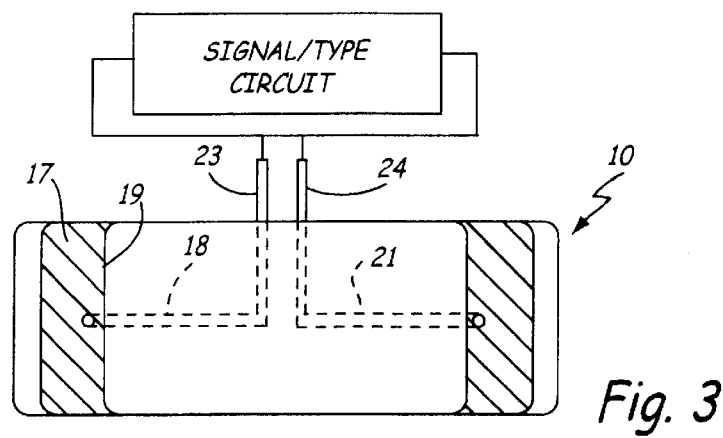
FIG. 3 is a cross-sectional view taken along the line 3—3 in FIG. 2.

The conductor 18 may have a contact portion 21 together with a first post 23 and a second post 24, as can be seen with reference to FIG. 3. The first post 23 and the second post 24 may extend outside the seal body 17 for connection to an exterior signal-type electrical circuit, shown schematically. The electrical circuit may signal to an operator that the seal 10 requires replacement either based on the absence of electrical continuity through the contact portion 21 between the first post 23 and the second post 24, or based on the existence of electrical continuity between the conductor 18 and the shaft 12.

Figure 4:
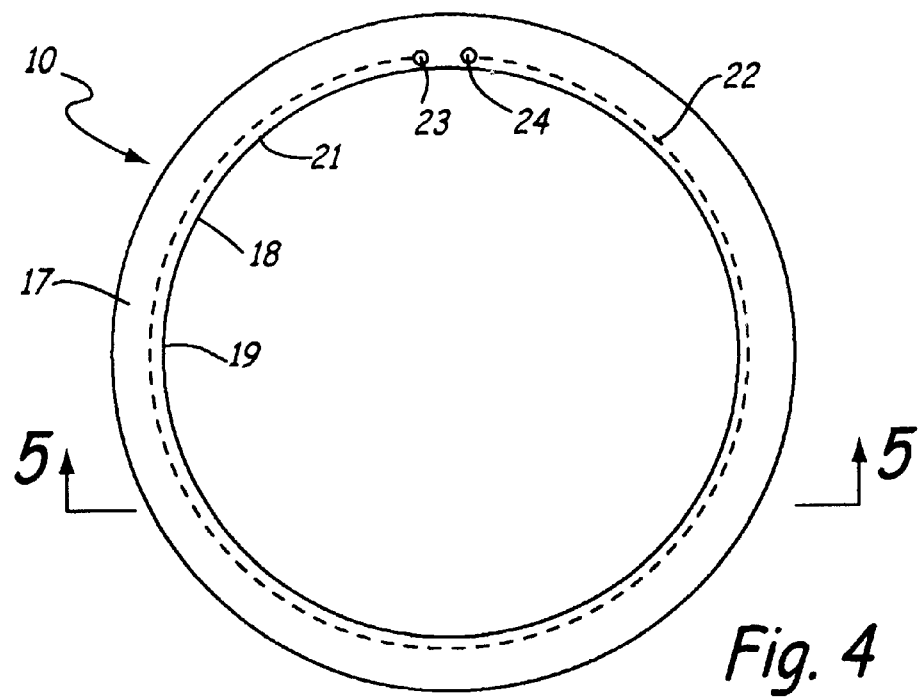
FIG. 4 is an enlarged fragmentary side view of the seal of FIGS. 1–3, after the seal body has worn to the specified depth.
Figure 5:
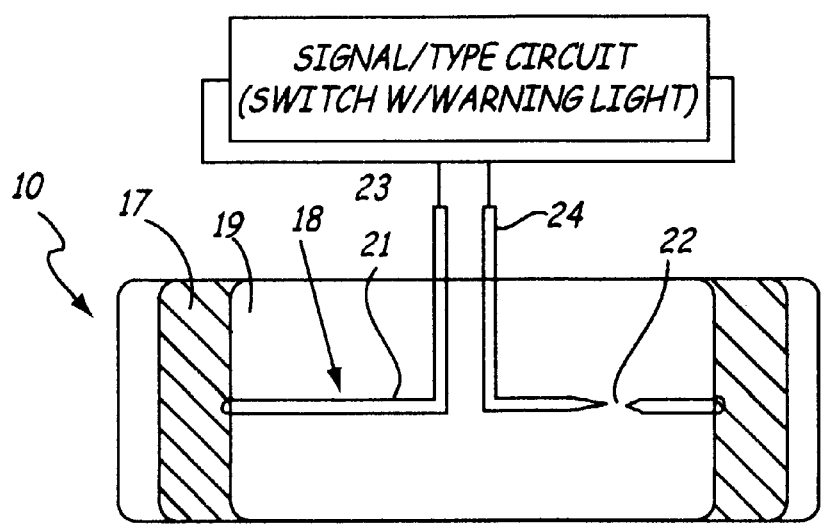
FIG. 5 is a cross-sectional view taken along the line 5—5 in FIG. 4, after the seal body has worn to the specified depth.

Illustration of the seal 10 immediately after friction between the shaft 12 and the seal body 17 has worn the seal body 17 to the specified depth can be seen with reference to FIGS. 4 and 5. At this point, the contact portion 21 of the conductor 18 has worn completely through at point 22, so that there no longer is electrical continuity between the first post 23 and the second post 24. A suitable mechanism may be provided in the signal-type circuit to indicate lack of electrical continuity, such as an electromagnetically driven switch which actuates a warning light. Alternatively, a suitable mechanism such as an ohmmeter may monitor electrical resistance between the first post 23 and the second post 24, with an increase in resistance as the conductor 18 begins to wear at point 22 indicating the need for seal replacement.

Figure 6:
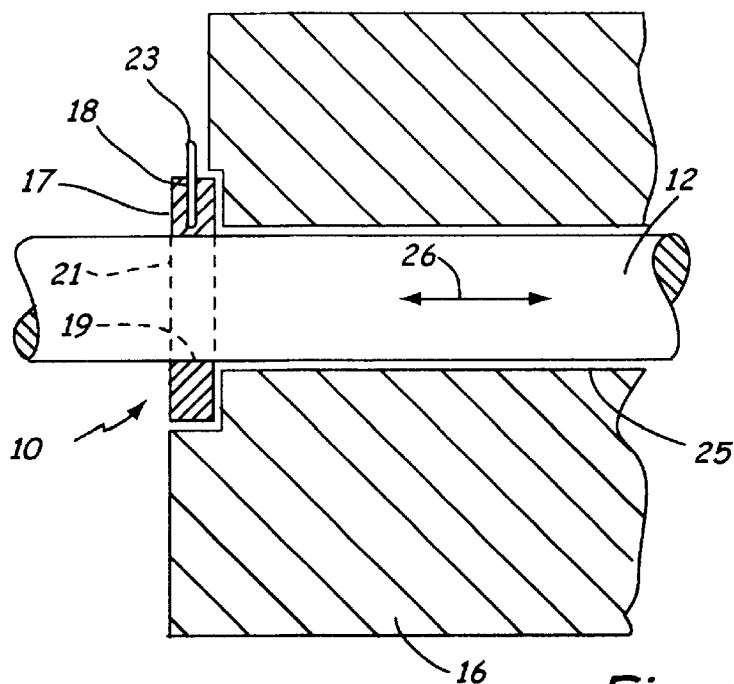
FIG. 6 shows a cross-sectional side view of an alternate embodiment of the seal in place, adjacent a bearing and around a shaft.
Figure 7:
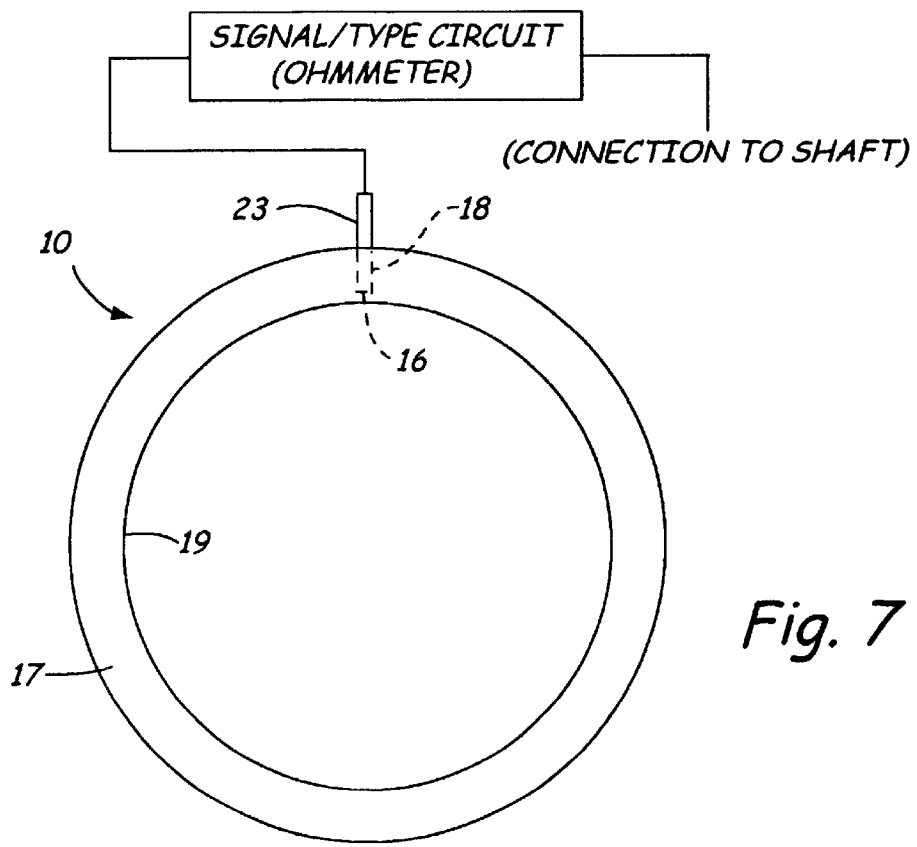
FIG. 7 is an enlarged fragmentary side view of the embodiment of the seal shown in FIG. 6.

An alternate embodiment of the seal 10 wherein the conductor 18 has only contact portion 21 and a first post 23 is depicted in FIGS. 6 and 7. The contact portion 21 of the conductor 18 does not encircle the shaft 12 but merely ends at the specified depth. When wear of the seal body 17 reaches the specified depth, the contact portion 21 contacts the shaft 12, creating electrical continuity between the conductor 18 and the shaft 12. As shown in this alternate embodiment, the shaft 12 may reciprocate as indicated by arrow 26. The shaft 12 may alternatively oscillate, changing direction of rotation, or otherwise move with respect to the seal 10. The shaft 12 may ride on a bearing surface 25 of the housing 16. A suitable meter may be provided in the signal-type circuit to read the presence of electrical continuity, such as an ohmmeter.

Operation of the Invention

Although operation of the present invention is apparent from the preceding description, it will be detailed hereinafter to provide a more complete understanding of the present invention. As the contact surface 19 of the seal body 17 wears away, the conductor 18 gradually moves closer and closer to the shaft 12. As seal wear continues, the contact portion 21 of the conductor 18 contacts the shaft 12 and wears away along with the seal body 17. The conductor 18 is embedded or attached at a specified depth such that the conductor 18 can wear entirely through before the seal 10 begins to leak. When the contact portion 21 of the conductor 18 is worn entirely through, as shown in FIGS. 4 and 5 at point 22, there is no longer electrical continuity between the first post 23 and the second post 24. This may indicate to an operator that the seal body 17 has worn to a point such that the seal 10 requires replacement.

ALTERNATE EMBODIMENTS

Figure 8:
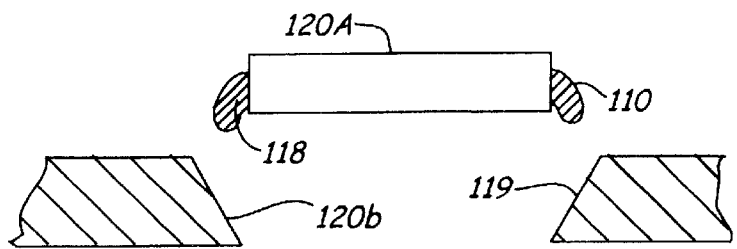
FIG. 8 is a cross-sectional side view of an alternate embodiment of the seal in place in a hatch.

An alternate embodiment of the seal 110 wherein the seal is used in a hatch, such as are found, for example, in ships and airplanes can be seen in FIG. 8. The seal 110 is disposed between the hatch lid 120a and the opening 120b defined in the hold of the ship. As has been mentioned above, the hatch lid 120a and the opening 120b may be said to reciprocate with respect to each other, in the sense of opening and closing with regard to each other. However, when a seal 110 is in fluid tight sealing relationship between the hatch lid 120a and the opening 120b, the seal 110 may more properly be termed a static or stationary seal, since the hatch lid 120a, the opening 120b and the interposed seal 110 remain stationary with regard to each other as long as seal integrity is maintained.

A conductor 118 may be embedded within the seal 110 at a specified depth. The seal 110 may be initially formed such that the contact surface 119 has an interference fit with the outer surface of the hatch lid 120a. The portion of the seal 110 forming the interference fit may be referred to as the wear lip. The specified depth at which the conductor 118 is embedded within or attached to the seal 110 may be slightly less than the depth of seal wear which will cause the seal 110 to leak. The electrical conductor 118 may be embedded in the seal body, attached to the seal body or otherwise positioned so that wear of the seal body will gradually change the location of the conductor with respect to the adjacent surface. Wear of the seal body to a specified depth may be detected by electrical continuity of the conductor. The conductor 118 may be positioned such that it is worn entirely through when the wear of the seal body reaches a specified depth, with loss of electrical continuity through the conductor indicating that the seal requires replacement. A suitable meter may be provided in the signal-type circuit to read the presence of electrical continuity, such as an ohmmeter.

Figure 9:
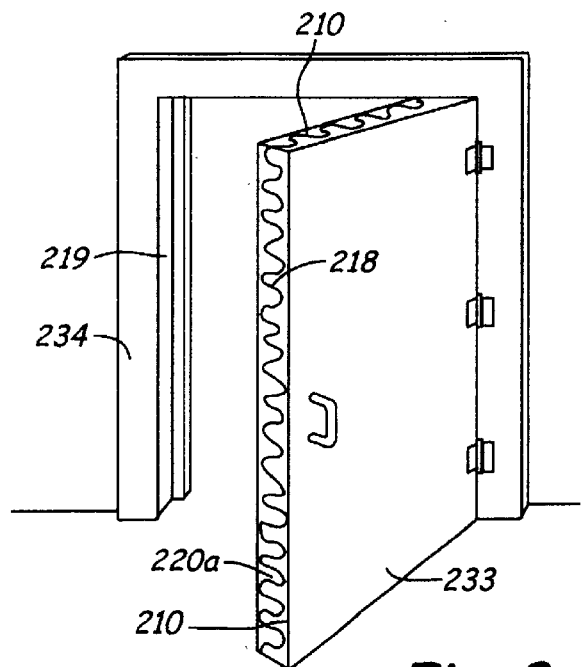
FIG. 9 is a cross-sectional side view of an alternate embodiment of the seal in place in a door.

An alternate embodiment of the seal 210 in place in a door structure 231 is shown in the cross-sectional side view of FIG. 9. The door structure 231 includes a door jam 232 and a pivotable door 233 such as might be used in a large commercial freezer. The seal 210 prevents movement of fluid between the door 233 and the door jam 232. The door structure 231 is particularly useful in the environments where the room is first closed by the door, filed with a gas and then exhausted of the gas before opening the door. This is done for example in gaseous treatment of metals. The seal 210 may be mounted either on the door itself or on the sill surrounding the door. The door jam 232 and the pivotable door 233 may be said to reciprocate with respect to each other, in the sense of opening and closing with regard to each other. However, when the seal 210 is in fluid tight sealing relationship between the door jam 232 and the door 233, the seal 210 may more properly be termed a static or stationary seal, since the door jam 232, the door 233 and the interposed seal 210 are all stationary with regard to each other as long as the integrity of the sealing relationship is maintained.

A conductor 218 may be embedded within the seal 210 at a specified depth. The seal 210 may be initially formed such that the contact surface 219 has an interference fit with the outer surface of the door 220a. The portion of the seal 210 forming the interference fit may be referred to as the wear lip. The specified depth at which the conductor 218 is embedded within or attached to the seal 210 may be slightly less than the depth of seal wear which will cause the seal 210 to leak. The electrical conductor 218 may be embedded in the seal body, attached to the seal or otherwise positioned so that wear of the seal will gradually change the location of the conductor with respect to the adjacent moving surface. Wear of the seal to a specified depth can be detected by electrical continuity of the conductor. The conductor 218 may be positioned such that it is worn entirely through when the wear of the seal body reaches a specified depth, with loss of electrical continuity through the conductor indicating that the seal requires replacement. A suitable meter may be provided in the signal-type circuit to read the presence of electrical continuity, such as an ohmmeter.

Figure 10:
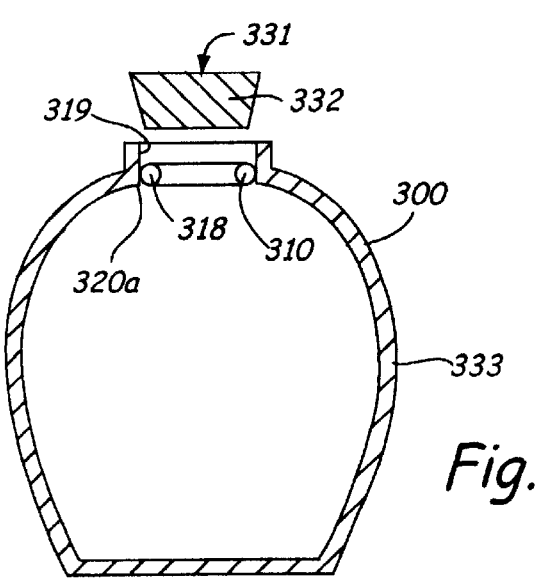
FIG. 10 is a cross-sectional side view of an alternate embodiment of the seal in place in a lid.

An alternate embodiment 310 of the seal in place in a lid structure such as a lid that is used in a vacuum pot or bottle 300 may be seen with reference to the cross-sectional side view of FIG. 10. The lid structure 331 includes a lid 332 and a pot or bottle 333 such as might be used in a commercial laboratory. The seal 310 prevents movement of fluid between the bottle 333 and the lid 332. The lid structure 331 is particularly useful in environments where the vacuum bottle is first closed by the lid and evacuated. Alternatively, the pot or bottle may be filled with a gas and then exhausted of the gas before opening the pot or bottle. This may be done for example in gaseous treatment of metals or chemicals. The seal 310 may be mounted either on the lid itself or on the rim surrounding the opening the bottle. The lid 332 and the bottle 333 may be said to reciprocate with respect to each other, in the sense of opening and closing with regard to each other. However, when a seal 310 is in fluid tight sealing relationship between the lid 332 and the bottle 333, the seal 310 may more properly be termed a static or stationary seal, since the lid 332, the bottle 333 and the interposed seal 310 are all stationary with regard to each other as long as the integrity of the sealing relationship is maintained.

A conductor 318 may be embedded within the seal 310 at a specified depth. The seal 310 may be initially formed such that the contact surface 319 has an interference fit with the outer surface of the bottle 320a. The portion of the seal 310 forming the interference fit may be referred to as the wear lip. The specified depth at which the conductor 318 is embedded within or attached to the seal 310 may be slightly less than the depth of seal wear which will cause the seal 310 to leak. The electrical conductor 318 may be embedded in the seal body, attached to the seal or otherwise positioned so that wear of the seal will gradually change the location of the conductor with respect to the adjacent moving surface. Wear of the seal to a specified depth can be detected by electrical continuity of the conductor. The conductor 318 may be positioned such that it is worn entirely through when the wear of the seal body reaches a specified depth, with loss of electrical continuity through the conductor indicating that the seal requires replacement. A suitable meter may be provided in the signal-type circuit to read the presence of electrical continuity, such as an ohmmeter.

Figure 11:
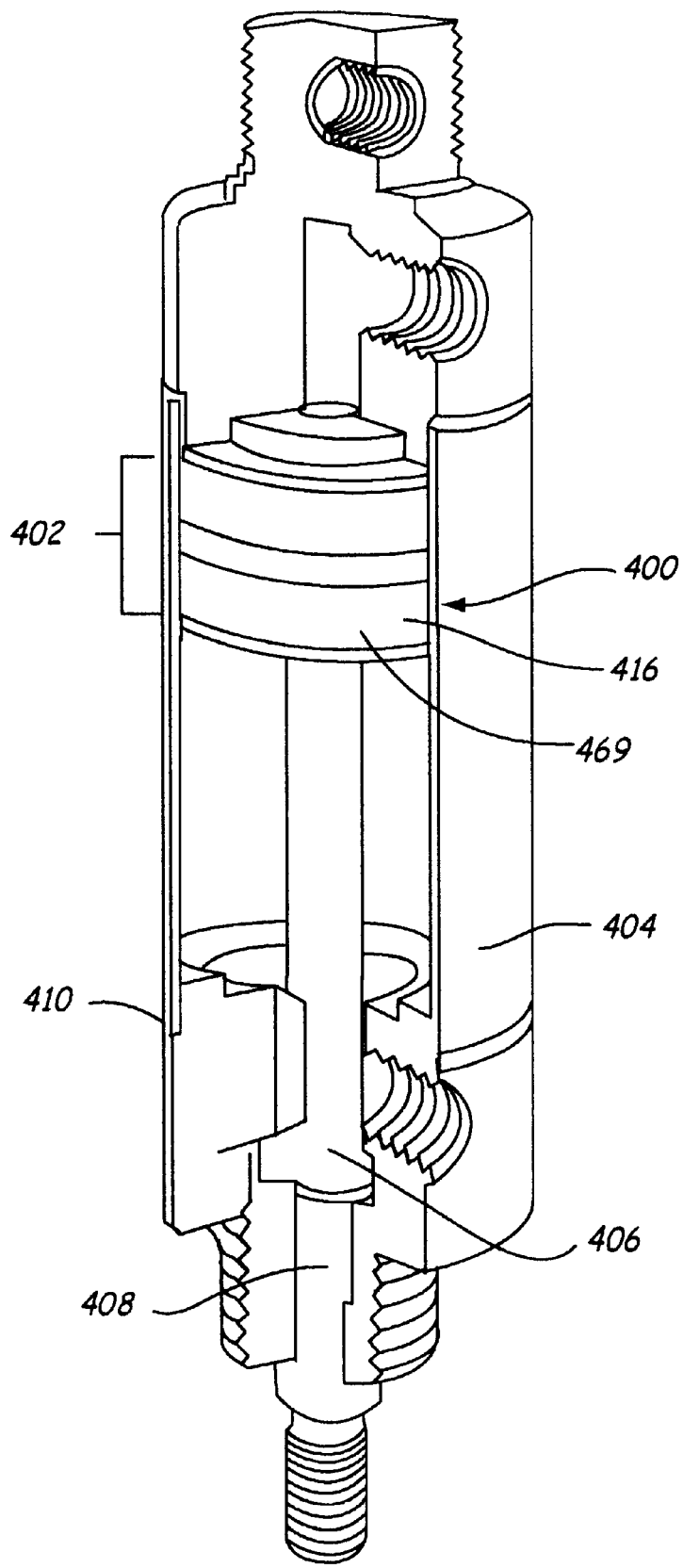
FIG. 11 is s cross-sectional side view of an embodiment of the seal in place in a piston and cylinder.
Figure 14:
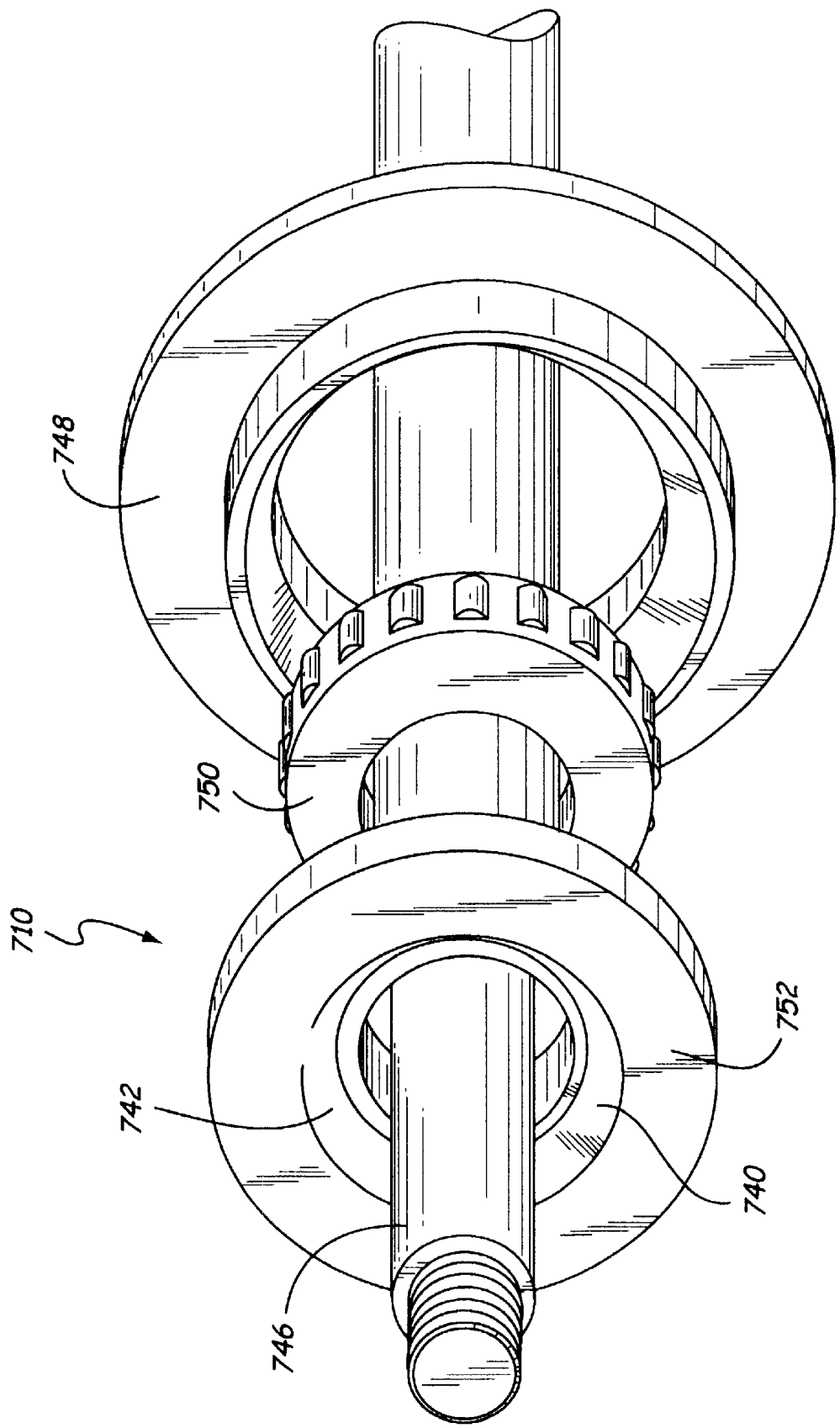
FIG. 14 is a perspective view of an embodiment of the seal provided with an optical fiber as an indicator of seal wear or deterioration.

Another embodiment of the seal or seals 400 of this invention in place in a piston 402 and cylinder 404 is shown in the cross-sectional side view of FIG. 11. The piston seal 400 illustrated is constructed so that the seal 400 always makes contact with the connecting rod 406 and the connecting rod 406 is insulated from the cylinder 404. This may be done with an insulating bushing 408 on the connecting rod 406 or with an insulation seal 410 on the inner surface of the cylinder 404. By monitoring a contact to the connecting rod 406 and one on the cylinder 404, a closed circuit may be used to indicate piston seal 400 wear. The position of the conductor in the piston seal 400 is shown in FIG. 11, embedded within the seal 400 at a specified depth, as described above with reference to similar seals of this invention in FIGS. 1–10. FIG. 11 shows the seal 400 in place, around the piston 402 in contact with the connecting rod 406 and insulated from the cylinder 404. The piston 402 may reciprocate as indicated by arrow 414. The seal 400 includes a seal body 416 and an embedded conductor 409. As shown in FIG. 14, the seal body 416 may press against the connecting rod 406 and the insulation seal 410 on the inner surface of the cylinder 404, forming a fluid tight seal between the seal body 416, the connecting rod 406 and the cylinder 404. The seal body 416 functions to prevent,fluid leakage from one side of the piston 402 to the other within the cylinder 404 around the connecting rod 406.

The seal body 416 may have a contact surface defined as the surface which contacts the connecting rod 406 to form a fluid tight seal. The seal body 416 may be composed of a polymeric material or other suitable substance and should be a dielectric or an electrical insulator. The material of the seal body 416 is softer than the connecting rod 406 so that friction preferentially wears the seal body 416 rather than the connecting rod 406. The contact surface of the seal body 416 gradually wears away due to friction between the connecting rod 406 and the seal body 416. The specified depth at which the conductor 409 is embedded within or attached to the seal 400 may be slightly less than the depth of seal wear which will cause the seal 400 to leak. The electrical conductor may be embedded in the seal body 416, attached to the seal body 416 or otherwise positioned so that wear of the seal 400 will gradually change the location of the conductor with respect to the adjacent surface of the cylinder 404. Wear of the seal 400 to a specified depth can be detected by electrical continuity of the conductor. The conductor may be positioned such that it is worn entirely through when the wear of the seal body 416 reaches a specified depth, exposing the conductor 409 to the cylinder 404 providing continuity from the connecting rod 406 to the cylinder 404 with electrical continuity through the conductor indicating that the seal 400 requires replacement. A suitable meter may be provided in the signal-type circuit to read the presence of electrical continuity, such as an ohmmeter. As described in detail above with reference to FIG. 2, the conductor may be composed of any material which conducts electricity, such as a metal wire or a carbon filament. Preferably, the conductor may be formed of an electrically conductive polymer, such as PTF. The process of applying PTF has been fully described above with reference to FIG. 2.

Figure 12:
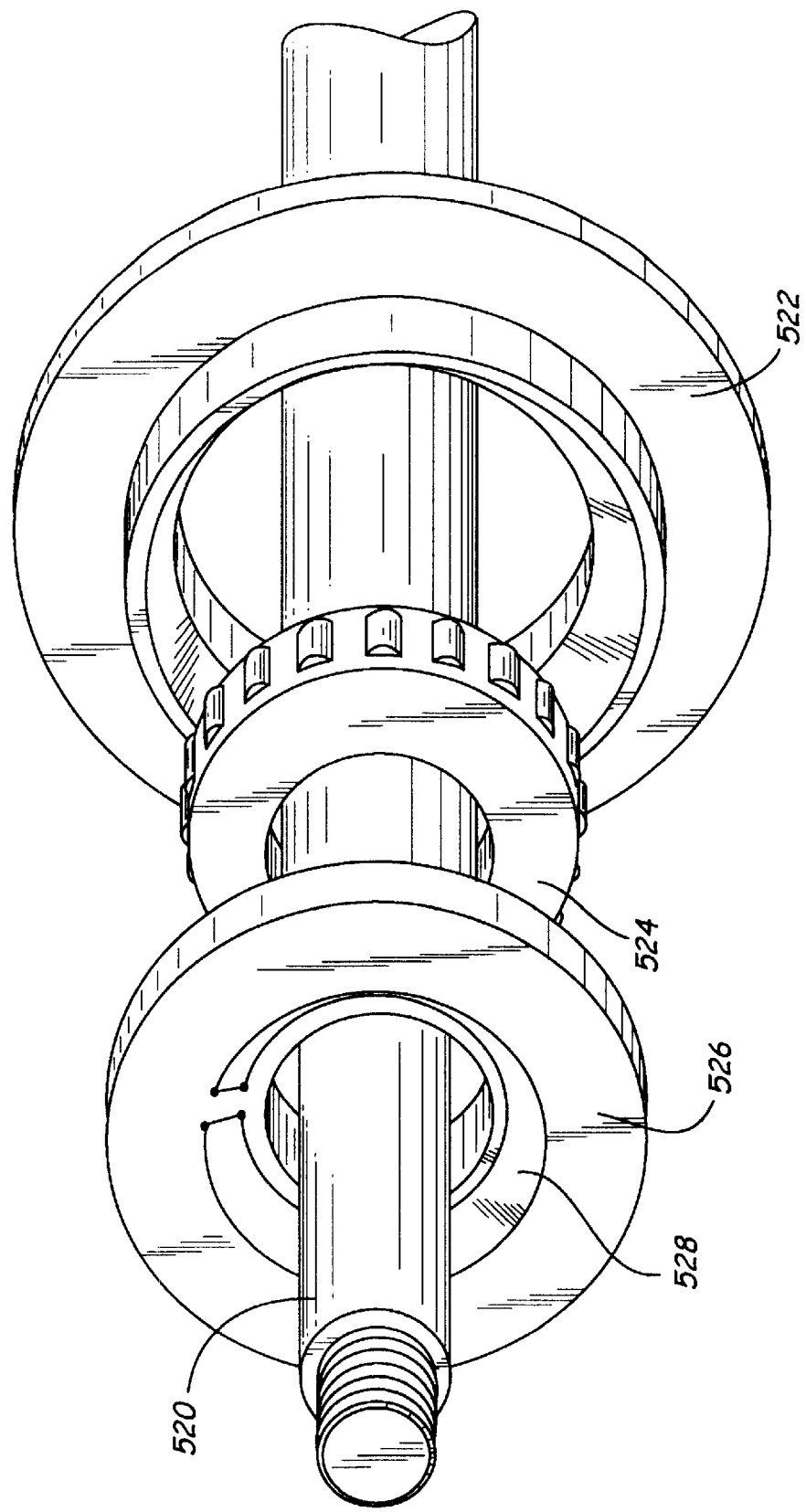
FIG. 12 is a perspective view of an embodiment of the seal with a PTF coating over the location of a conductor in position against a cylinder and a bearing.

In order to prevent arching or sparking through a bearing, thus ruining the bearing, it is necessary to continually ground or short a seal of the present invention. Such arching or sparking can occur in bearings, such as on generators and motors. As illustrated with reference to FIG. 12, this potential condition can be remedied according to the present invention by coating the entire sealing surface 528 of the seal 526 with an electrically conductive polymer, such as PTF. FIG. 12 shows a rod 520 supporting a hub 522, a bearing 524 and a seal 526, according to the present invention. The seal 526 forms an interference fit between the bearing 524 and an adjacent sealing surface (not shown). As seen in FIG. 12, the entire sealing surface 528 of the seal 526 which contacts the rod 520 may be coated with a layer of PTF. The process of applying PTF has been fully described above with reference to FIG. 2.

Figure 13:
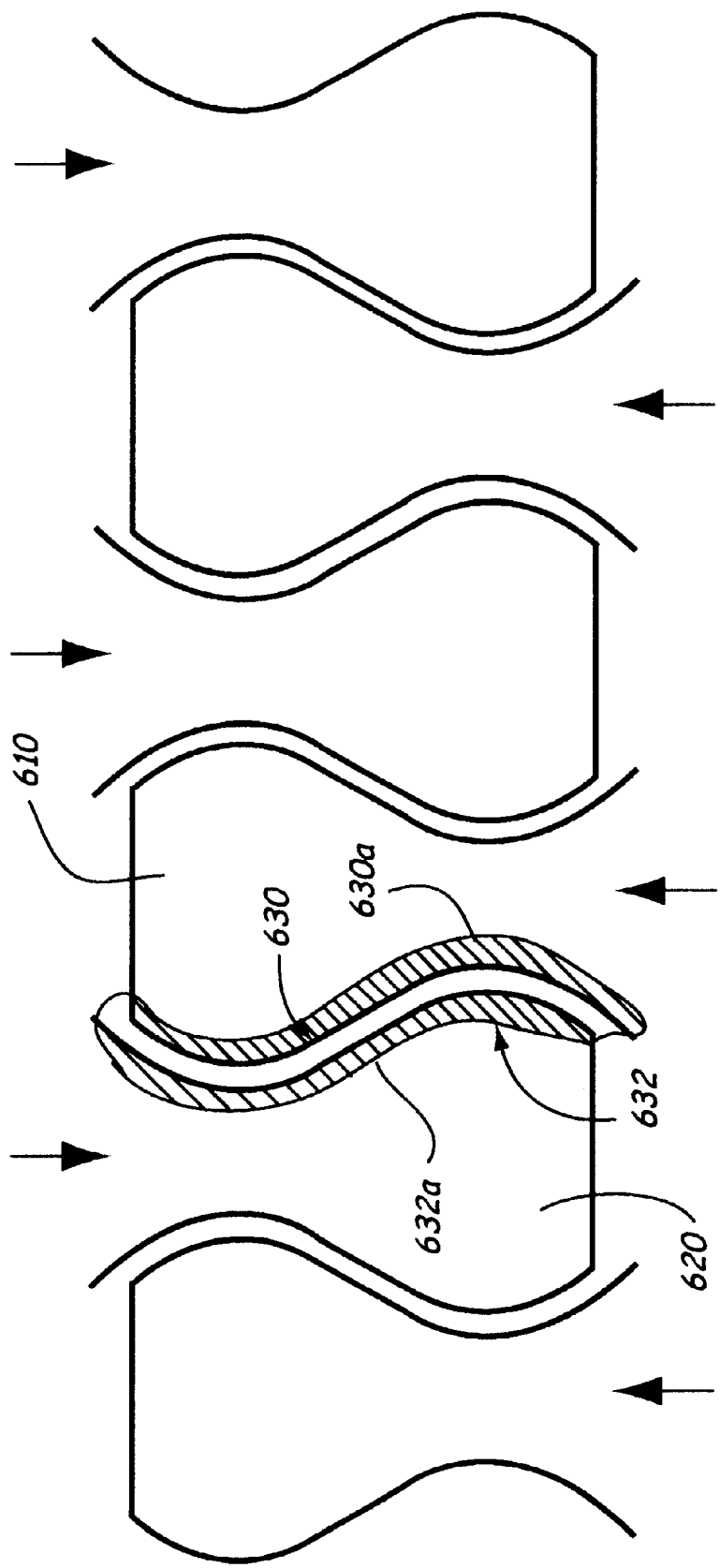
FIG. 13 is schematic view of an embodiment of an interlocking arrangement of two sealing surfaces.

An embodiment of the seal of this invention, which may be of particular value with regard to static seals, is described with reference to FIG. 13. As described above, in seals such as found in interfitting members of hatches, air locks, doors, covers, lids, caps, and the like, when a seal is in fluid tight sealing relationship between such interfitting members, the seal may be termed a static or stationary seal, since the interfitting members and the interposed seal are all stationary with regard to each other while the integrity of the sealing relationship is maintained. The present static seal may be formed, for example, between a hatch door 610 and the structure 620 defining the hatch opening. The hatch door 610 includes a set of intermeshing and interlocking members 630. The structure 620 includes a corresponding set of intermeshing and interlocking members 632. As illustrated in FIG. 13, a sealing relationship according to this invention may be effected by interengaging the first and second sets of intermeshing and interlocking members 630, 632, each of which may comprise plurality of such intermeshing, interlocking members 630, 632, respectively. Members 630 may be embedded with or have applied thereto a first portion of a conductive circuit. Members 632 may be embedded with or have applied thereto a second portion of a conductive circuit. Interengaging members 630 and 632 may then operate to complete a conductive circuit throughout the sealing relationship, according to this invention. As illustrated in FIG. 13, the plurality of members 630 and 632, respectively, are mirror images of each other, although other arrangements may operate equally as well, as long as they can effectively interengage to complete a conductive circuit. Thus, seal body 610 may be formed with a first set of members 430, while the adjacent sealing surface 620 may be formed with a second set of members 432, such that members 430 and 432 interengage each other is effecting a sealing relationship. Interengagement of members 630 and 632 thus ensures a secure fluid tight seal, while also providing a means of detecting that the sealing relationship is complete between the seal body 610 and the adjacent sealing surface 620. Electrical conductivity throughout the sealing relationship indicates that all members 630 and 632 are securely interengaged, while an absence of such electrical conductivity indicates that a lack of seal integrity. This may indicate either that the seal needs to be more firmly engaged or that either the seal body or hatch 610 or the adjacent sealing surface 620 of the opening need to be replaced. As described above, a PTF circuit may be applied on the two sealing faces 630a, 632a in such a way that one side contacts the other as the faces 630a, 632a interengage. The design may be similar to a zipper, as shown in FIG. 13, although other interengaging configurations may work equally as well.

According to another embodiment of the present invention, an optical conductor, such as an optical fiber, may be embedded in or applied to a seal. Optical sensor technology may then be used in measurement of temperature, strain and wear of seals of this invention provided with optical fibers.

Optical sensors are available which cover the entire range of the spectrum, including both visible and invisible light, such as infrared (IR). Non-contact temperature measurement and control may be effected by coupling optical fibers to IR detectors and signal processing electronics. As well known in the industry, fibers used in IR transmission may be made of glass or other suitable materials selected to transmit radiation of the spectral region of interest. If optical fibers expand thermally or become physically strained, this can easily be determined by appropriate optical sensors. With multiplexing, a number of sensors on different light wavelengths may be able to input to a single signal processor, and a number of parameters or variables may be monitored simultaneously. Signal processing may correlate strain or thermal expansion with wavelength shift. These properties of optical fibers are applied to the sealing relationship of the present invention.

An optical conductor, such as an optical fiber 740, may be embedded in or applied onto the sealing surface 742 of a seal body 744 of the present invention, as illustrated with reference to FIG. 14, in the same manner as has been described herein above with regard to the electrical conductor. The optical fiber 740 may be embedded within the seal body 744 at a specified depth. Alternatively, the optical fiber 740 may be attached to the outside of the seal body 744 at a specified depth. FIG. 14, shows a rod 746 supporting a hub 748, a bearing 750 and a seal 752 provided with an optical fiber 740, according to the present invention. The seal 752 forms an interference fit between the bearing 750 and an adjacent sealing surface (not shown). The portion of the seal body 744 forming the interference fit may be referred to as the wear lip. The specified depth at which the optical fiber 740 is embedded within or attached to the seal body 744 may be slightly less than the depth of seal wear which will cause the seal 752 to leak. For instance, the specified depth may be at a certain percentage of the initial depth of the wear lip, such as, for example, 90%. In this case, if leakage of the seal 752 occurs when the wear lip is completely worn away, optical continuity through the optical fiber 440 would indicate when the seal 752 is 90% worn toward leakage. Of course, the desired specified depth of the optical fiber 440 is dependant upon the particular application, and this example is not intended to limit the scope of the invention. Similarly, a seal in association with an optical fiber according to this invention need not be limited to the specific type of seal or sealing relationship illustrated in FIG. 14. Thus, a seal associated with an optical fiber may also be suitable for use in connection with other types of moving, sliding or reciprocating seals or with other types of stationary or static seals as described herein.

The optical fiber 740 may be attached to the seal 752. As the layers of slightly denser fiber 740 are worn away, the exact rate of wear of the seal 752 may be monitored. If the fiber 740 expands thermally or becomes strained, the resultant change in optical activity may be measured. Signal processing may measure wear, temperature and strain. Suitable optical sensors for measuring changes in the optical fibers due to changes in temperature, strains and wear are commercially available. By measurement of changes in such parameters, the optimum time for replacement of seals can be readily determined.

According to another embodiment of this invention, polymer thin films, carrying embedded indicators sensitive to the presence of a certain chemical of interest, may be coated on a seal, to indicate exposure of the seal to that chemical. The embedded indicator may change to a distinct identifying color upon contact with the chemical of interest. Such a coating of indicator-embedded polymer thin films on a seal of this invention may be used to indicate not only exposure of the seal to a certain chemical, but also any possible deterioration or weakening of the seal due to such exposure. The polymer thin films which may be used for this purpose are commercially available. Suitable embedded indicators for this application are Polymer thin films with chemical sensitive embedded indicators admixed therein are available from Geo-Centers Inc., Newton Centre, Mass. Such seals may be useful, for example, in static seals as described above and with the seals described with regard to FIGS. 8–10. By shining an appropriate querying light on the seal coated with the indicator embedded polymer thin film, the color of the indicator may be used to measure exposure of the seal to the chemical, leaking of the chemical and wear or deterioration of the seal due to the action of the chemical. In a suitable querying light, the color of the embedded indicator may be transmitted by an optical fiber back to a signal processor. Such a querying light may use at least two light sources, one where the indicator shows the most change and one where it shows the least. Such a querying light is available from Geo-Centers Inc., Newton Centre, Mass., under the trade name "Optrode.". Another suitable querying light may be a flashlight which illuminates using a light-emitting diode (LED) of a proper wave length, rather than an incandescent bulb. Such LED flashlights are available from LEDtronics, Inc., 4009 Pacific Coast Hwy., Torrance, Calif. 90505. Strain and temperature may also be measured in this manner. Temperature may be remotely measured using an IR thermometer. Target emissivity error may be eliminated by matching the emissivity of the embedded indicator in the polymer thin film and minimum, maximum or average temperatures may be measured. Suitable IR thermometers are the OS520 series handheld IR thermometers available from OMEGA Engineering.

Although the present invention has been described with reference to preferred embodiments, workers skilled in the art will recognize that changes may be make in form and detail without departing from the spirit and scope of the invention.

That which is claimed is:

1. A seal for preventing passage of a fluid from between two members, said seal comprising:

sealing means for engaged contact with both members, so as to prevent passage of fluid between either of the members and the sealing means, said sealing means more readily deteriorated than one of the members, the sealing means being adapted to retain a fluid tight seal with the members as long as the sealing means has not deteriorated beyond a specified degree, and a conductor for placement about said one member, said conductor being adapted to conduct electricity;

a dielectric polymer film electrically isolating the sealing means and the conductor from either of the two members, the two members and seal being stationary with regard to each other in fluid tight sealing contact; and wherein the conductor is positionally associated to the sealing means, such that deterioration of the sealing means beyond said specified degree corresponds with electrical discontinuity of the conductor, such that the electrical discontinuity through the conductor indicates a requirement for seal replacement.

2. A seal according to claim 1, wherein said members are sliding or reciprocating with respect to each other.

3. A seal according to claim 1, wherein deterioration of the seal is by wear abrasion against a member.

4. A seal according to claim 1, wherein deterioration of the seal is by extended contact with the fluid.

5. A seal according to claim 1, wherein deterioration of the seal is by aging.

6. A seal according to claim 1, wherein deteriorated of the seal is by cracking.

7. A seal according to claim 1, wherein said conductor is comprised of two mating parts, one of which is associated with the seal and another of which is associated with one of the members, such that interconnection the two mating parts provides electrical continuity of the conductor and fluid tight engagement of the seal.

8. A seal according to claim 1, wherein said conductor comprises an electrically conductive polymer thick film applied in a liquid form to the sealing means.

9. A seal for preventing passage of a fluid between two members, said seal comprising:

sealing means for engaged contact with both members, so as to prevent passage of fluid between either of the members and the sealing means, said sealing means more readily deteriorated than one of the members, the sealing means being adapted to retain a fluid tight seal with the members as long as the sealing means has not deteriorated beyond a specified degree;

a conductor for placement about said one member, said conductor being adapted to conduct electricity; and a dielectric polymer film electrically isolating the sealing means and the conductor from either of the two members;

wherein the conductor is positionally associated to the sealing means and to the dielectric polymer film, such that deterioration of the sealing means beyond said specified degree corresponds with electrical discontinuity of the conductor, such that the electrical discontinuity through the conductor indicates a requirement for seal replacement.

10. A seal according to claim 9, wherein the two members and the seal are stationary with regard to each other in fluid tight sealing contact.

11. A seal according to claim 9, wherein said conductor is comprised of two mating parts, one of which is associated with the seal and another of which is associated with one of the members, such that interconnection the two mating parts provides electrical continuity of the conductor and fluid tight engagement of the seal.

12. A seal according to claim 9, wherein said members are sliding or reciprocating with respect to each other.

13. A method of determining wear of a seal having a sealing means which prevents passage of a fluid between two members, said method comprising the steps of:

positioning the sealing means in engaged contact with both members, so as to prevent passage of fluid between either of the members and the sealing means, said sealing means chosen to be more readily deteriorated than one of the members, said sealing means designed and adapted to retain a fluid tight seal with the members as long as the sealing means has not deteriorated beyond a specified degree;

placing a conductor about said one member, said conductor being adapted to conduct electricity;

electrically isolating the sealing means and the conductor from either of the two members using a dielectric polymer film;

positionally associating the conductor to the sealing means, such that deterioration of the sealing means beyond said specified degree will correspond with electrical discontinuity of the conductor;

determining electrical continuity;

wherein determination of electrical discontinuity indicates a requirement for seal replacement.

14. A method of determining wear of a seal having a sealing means which prevents passage of a fluid between two members, said method comprising the steps of:

positioning the sealing means in engaged contact with both members, so as to prevent passage of fluid between either of the members and the sealing means, said sealing means chosen to be more readily deteriorated than one of the members, said sealing means designed and adapted to retain a fluid tight seal with the members as long as the sealing means has not deteriorated beyond a specified degree;

electrically isolating the sealing means and the conductor from either of the two members with a dielectric polymer film;

placing a conductor about said one member, said conductor being adapted to conduct electricity;

positionally associating the conductor to the sealing means, such that deterioration of the sealing means beyond said specified degree will correspond with electrical discontinuity of the conductor;

determining electrical continuity;

wherein determination of electrical discontinuity indicates a requirement for seal replacement.

15. A seal for preventing passage of a fluid from between two members, said seal comprising:

sealing means for engaged contact with both members, so as to prevent passage of fluid between said members and the sealing means, the sealing means being adapted to retain a fluid tight seal with the members as long as the sealing means has not deteriorated beyond a specified degree;

a conductor for placement about said one member, said conductor being adapted to conduct a signal; a dielectric polymer film electrically isolating the sealing means and the conductor from either of the two members, a dielectric polymer film electrically isolating the sealing means and the conductor from either of the two members, and wherein the conductor is positionally associated to the sealing means, such that deterioration of the sealing means beyond said specified degree corresponds with signal discontinuity of the conductor, such that the signal discontinuity through the conductor indicates a requirement for seal replacement.

16. The seal for preventing passage of a fluid from between two members defined in claim 15, wherein said signal comprises an electrical signal.

* * * * *